(12) United States Patent (10) Patent No.: US 12,601,367 B2

Uracs (45) Date of Patent: Apr. 14, 2026

(54) CONNECTING MEMBER AND ARRANGEMENT

(71) Applicants: Róbert Uracs, Budapest (HU); TREND-INOVEST MAGYARORSZÁG KFT., Budapest (HU)

(72) Inventor: Róbert Uracs, Budapest (HU)

(73) Assignee: Trend-Inovest Magyarorszag KFT, Budapest (HU)

( * ) Notice: Subject to any disclaimer, the term of this patent is extended or adjusted under 35 U.S.C. 154(b) by 270 days.

(21) Appl. No.: 18/557,944

(22) PCT Filed: May 3, 2022

(86) PCT No.: PCT/HU2022/050042
§ 371 (c)(1),
(2) Date: Oct. 30, 2023

(87) PCT Pub. No.: WO2022/234308
PCT Pub. Date: Nov. 10, 2022

(65) Prior Publication Data
US 2024/0218896 A1 Jul. 4, 2024

(30) Foreign Application Priority Data
May 3, 2021 (HU) ................................... P2100181

(51) Int. Cl.
*F16B 12/22* (2006.01)
*F16B 21/02* (2006.01)
*F16B 12/24* (2006.01)

(52) U.S. Cl.
CPC .............. *F16B 21/02* (2013.01); *F16B 12/22* (2013.01); *F16B 12/24* (2013.01)

(58) Field of Classification Search
CPC ........ F16B 5/10; F16B 5/0208; F16B 5/0642; F16B 21/02; F16B 21/04; F16B 19/109; B63B 21/04; E02B 3/24
See application file for complete search history.

(56) References Cited

U.S. PATENT DOCUMENTS

| | | | |
|---|---|---|---|
| 584,132 | A | 6/1897 | Hunzinger |
| 1,773,501 | A | 8/1930 | Schölnhammer |

(Continued)

FOREIGN PATENT DOCUMENTS

| | | |
|---|---|---|
| CA | 1290558 C | 10/1991 |
| CN | 204105483 U | 1/2015 |

(Continued)

OTHER PUBLICATIONS

Victorian High Chair/Rocker published: May 18, 2017 (May 18, 2017), retrieved from the Internet: Nov. 16, 2023) (Nov. 16, 2023), Link: https://onthesquareemporium.com/product/victorian-high-chairrocker/.

(Continued)

*Primary Examiner* — Daniel J Wiley
(74) *Attorney, Agent, or Firm* — Sand, Sebolt & Wernow Co., LPA

(57) ABSTRACT

A connecting member used in the furniture, toy, and construction industries. The connecting member is adapted to be mounted on a first structural element and a receiving unit adapted to be mounted on a section structure element. The connecting member also relates to the arrangement of the connecting member within structural elements. An operating unit contains a pin at one end forming a neck part and an elongated head, which together form a T-shape. The side of the neck part opposite the side facing the head part forms a collar. The operating unit includes a handle attached to the end of the pin opposite the end where the head part is formed. The receiving unit contains a plate defining an (Continued)

opening suitable for receiving and holding the head part and of a shape corresponding to the shape of a largest cross-section of the head part.

20 Claims, 4 Drawing Sheets

(56)                   References Cited

U.S. PATENT DOCUMENTS

| | | | | |
|---|---|---|---|---|
| 2,470,011 A | | 5/1949 | Winter et al. | |
| 2,705,524 A | | 4/1955 | Shipman | |
| 2,826,388 A | * | 3/1958 | Janos | F25D 23/067 403/252 |
| 3,150,703 A | * | 9/1964 | Preziosi | F16B 21/02 411/908 |
| 3,220,078 A | * | 11/1965 | Preziosi | F16B 21/086 402/80 P |
| 3,235,219 A | * | 2/1966 | Green | F25D 23/067 248/222.52 |
| 3,272,061 A | * | 9/1966 | Seckerson | F16B 21/02 411/15 |
| 3,344,488 A | * | 10/1967 | Texier | F16B 5/00 24/DIG. 58 |
| 3,381,925 A | * | 5/1968 | Higuchi | B63B 25/28 410/116 |
| 3,849,839 A | * | 11/1974 | Zimber | A44B 1/32 24/108 |
| 3,894,493 A | * | 7/1975 | Strecker | B65D 90/0013 24/287 |
| 3,966,340 A | * | 6/1976 | Morris | F16B 12/22 248/188.8 |
| 3,986,780 A | * | 10/1976 | Nivet | F16B 21/02 411/908 |
| 4,194,429 A | * | 3/1980 | Wright | F16B 21/04 411/337 |
| 4,205,876 A | | 6/1980 | Cetina | |
| 4,247,219 A | * | 1/1981 | Ausprung | F16B 19/02 24/453 |
| 4,295,765 A | * | 10/1981 | Burke | F16B 37/145 410/101 |
| 4,297,963 A | * | 11/1981 | Beacom | B63B 21/04 294/93 |
| 4,315,651 A | * | 2/1982 | Endicott, Jr. | B63C 7/16 294/93 |
| RE31,106 E | * | 12/1982 | Pufpaff | F16B 21/02 403/162 |
| 4,457,650 A | * | 7/1984 | Tseng | B65D 90/0013 410/112 |
| 4,474,489 A | * | 10/1984 | Simon | H02G 15/007 403/197 |
| 4,599,768 A | * | 7/1986 | Doyle | F16B 21/02 24/456 |
| 4,618,183 A | | 10/1986 | Bauer | |
| 4,630,982 A | * | 12/1986 | Fenner | B61D 45/001 403/381 |
| 4,645,392 A | * | 2/1987 | Takaguchi | B63B 25/28 410/82 |
| 4,906,152 A | * | 3/1990 | Kurihara | F16B 37/043 174/138 D |
| 5,004,071 A | * | 4/1991 | Mallard | A62B 35/04 410/82 |
| 5,076,748 A | * | 12/1991 | Waterfield | F16B 35/041 411/84 |
| 5,142,834 A | * | 9/1992 | Laclave | F16B 5/10 24/453 |
| 5,188,324 A | * | 2/1993 | Joseph | A47B 96/068 248/222.52 |
| 5,199,836 A | * | 4/1993 | Gogarty | F16B 37/045 411/84 |
| 5,382,124 A | * | 1/1995 | Frattarola | F16B 5/0208 411/352 |
| 5,520,357 A | * | 5/1996 | Payne | B61D 45/006 244/118.6 |
| 5,636,954 A | * | 6/1997 | Henderson | B60R 9/04 411/84 |
| 5,690,379 A | | 11/1997 | Cayssials | |
| 5,806,922 A | | 9/1998 | Mendelovich | |
| 6,000,251 A | * | 12/1999 | Murray, Jr. | E05B 73/0082 70/57 |
| 6,155,641 A | | 12/2000 | Frost | |
| 6,601,864 B1 | | 8/2003 | Hoyt | |
| 6,733,221 B2 | * | 5/2004 | Linger | F16B 37/045 411/84 |
| 7,351,021 B2 | * | 4/2008 | Gombert | F16B 21/02 411/553 |
| 7,491,025 B2 | * | 2/2009 | Tangeman | A61G 13/0018 411/553 |
| 7,600,724 B2 | * | 10/2009 | Nelson | F16L 3/221 248/68.1 |
| 7,753,634 B2 | * | 7/2010 | Nakazato | F16B 21/02 24/663 |
| 8,240,966 B2 | * | 8/2012 | Figge | F16B 21/02 411/546 |
| 8,276,984 B1 | | 10/2012 | Jamison, Jr. | |
| 8,720,989 B2 | | 5/2014 | Jurcic et al. | |
| 8,915,321 B2 | * | 12/2014 | Lejeune | H01M 50/249 180/68.5 |
| 8,939,691 B2 | * | 1/2015 | Tseng | F16B 21/04 411/347 |
| 9,186,703 B2 | * | 11/2015 | Lane | B07B 1/4645 |
| 9,291,190 B2 | * | 3/2016 | Kammerer | F16B 5/0241 |
| 9,327,945 B2 | * | 5/2016 | Boisson | B66C 1/66 |
| 9,407,016 B2 | * | 8/2016 | Burris | H01R 4/304 |
| 10,487,866 B2 | * | 11/2019 | Wu | F16B 19/109 |
| 10,588,425 B1 | | 3/2020 | Jordan | |
| 10,629,335 B2 | * | 4/2020 | Rouleau | H01B 13/01209 |
| 10,947,091 B2 | * | 3/2021 | Betzler | B66C 1/66 |
| 11,098,839 B2 | * | 8/2021 | Wang | F16B 37/042 |
| 11,622,632 B2 | | 4/2023 | Tackaberry et al. | |
| 11,723,477 B2 | | 8/2023 | Rogers et al. | |
| 12,156,598 B1 | | 12/2024 | Geng | |
| 2004/0032152 A1 | | 2/2004 | Tally et al. | |
| 2004/0119277 A1 | * | 6/2004 | Girardin | B60R 22/201 280/801.2 |
| 2005/0099038 A1 | | 5/2005 | Hinds | |
| 2007/0172336 A1 | * | 7/2007 | Hsu | F16B 5/065 411/508 |
| 2007/0257159 A1 | * | 11/2007 | Nelson | F16L 3/137 248/73 |
| 2008/0182477 A1 | | 7/2008 | Catelli | |
| 2009/0074539 A1 | * | 3/2009 | Mahdavi | F16B 21/02 411/533 |
| 2009/0080999 A1 | * | 3/2009 | Dunn | F16B 21/02 411/500 |
| 2011/0262243 A1 | * | 10/2011 | Glickman | F16B 21/02 411/347 |
| 2012/0080910 A1 | | 4/2012 | Davis | |
| 2013/0020840 A1 | | 1/2013 | Berginc | |
| 2013/0056192 A1 | * | 3/2013 | Lee | F16B 41/002 165/185 |
| 2013/0183086 A1 | * | 7/2013 | Wang | F16B 5/0642 403/327 |
| 2014/0042780 A1 | | 2/2014 | Warncke et al. | |
| 2016/0003271 A1 | * | 1/2016 | Wang | F16B 17/006 403/322.4 |
| 2016/0126687 A1 | * | 5/2016 | Rouleau | H02G 3/32 29/748 |
| 2018/0202482 A1 | * | 7/2018 | Wu | F16B 19/109 |
| 2020/0386261 A1 | * | 12/2020 | Wang | F16B 21/02 |
| 2022/0362614 A1 | * | 11/2022 | Bugeaud | A63B 21/0442 |

FOREIGN PATENT DOCUMENTS

| | | |
|---|---|---|
| CN | 110558777 | 12/2019 |
| DE | 2804848 A | 8/1979 |
| DE | 202016002301 | 4/2016 |
| EM | 001233498-0001 | 9/2010 |
| EM | 001765595-0001 | 10/2010 |

(56) References Cited

FOREIGN PATENT DOCUMENTS

| EM | 001765595-0002 | | 10/2010 |
|----|----------------|----|---------|
| EM | 001765595-0003 | | 10/2010 |
| EM | 003113554-0001 | | 5/2016 |
| EP | 0036430 | A1 | 9/1981 |
| GB | 1256295 | A | 12/1971 |
| GB | 2494474 | A | 3/2013 |
| JP | 2014204946 | A | 10/2014 |
| WO | 2017007543 | A1 | 1/2017 |

OTHER PUBLICATIONS

INFANS 3 in 1 Baby High Chair, Convertible Toddler Table Chair Set published: Jul. 5, 2019 (Jul. 5, 2019), retrieved from the Internet: Nov. 16, 2023 (Nov. 16, 2023), Link: https://www.pricepulse.app/infans-5-in-1-baby-high-chair-convertible-toddler_us_4104617#google_vignette.

Loopwheels brochure published: Dec. 11, 2018 (Dec. 11, 2018), retrieved from the Internet: Nov. 16, 2023 (Nov. 16, 2023), Link: https://loopwheels.com/wp-content/uploads/2018/12/Loopwheels-Brochure.pdf.

International Search Report PCT Application No. PCT/HU2022/050041 published: Nov. 10, 2022 (Nov. 10, 2022), retrieved from the Internet Nov. 16, 2023 (Nov. 16, 2023).

Heavy Duty Turnlocks sold by Anemo Engineering: <URL: https://anemo.eu/turnlock-heavy-duty>. Retrieved from the Internet: Oct. 11, 2023.

IMAO Quarter-Turn Clamps sold by Anemo Engineering: <URL: https://anemo.eu/imao/quarter-turn-clamps>. Retrieved from the Internet: Oct. 11, 2023 (Oct. 11, 2023).

DZUS® Quarter-Turn Fasteners sold by Southco: <URL: https://southco.com/en_us_int/fasteners/emdzusemreg-quarter-turn-fasteners>. Retrieved from the Internet: Oct. 11, 2023 (Oct. 11, 2023).

International Search Report PCT Application No. PCT/HU2022/050042 published: Nov. 10, 2022 (Nov. 10, 2022), retrieved from the Internet: Nov. 16, 2023 (Nov. 16, 2023).

* cited by examiner

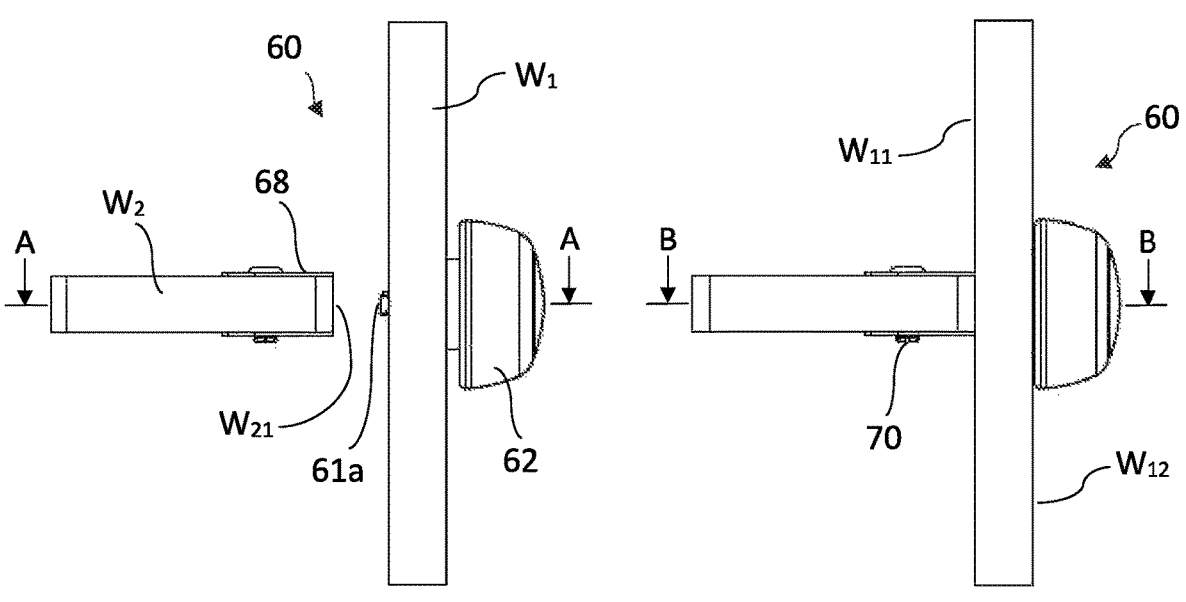
Figure 1.a                    Figure 1.c
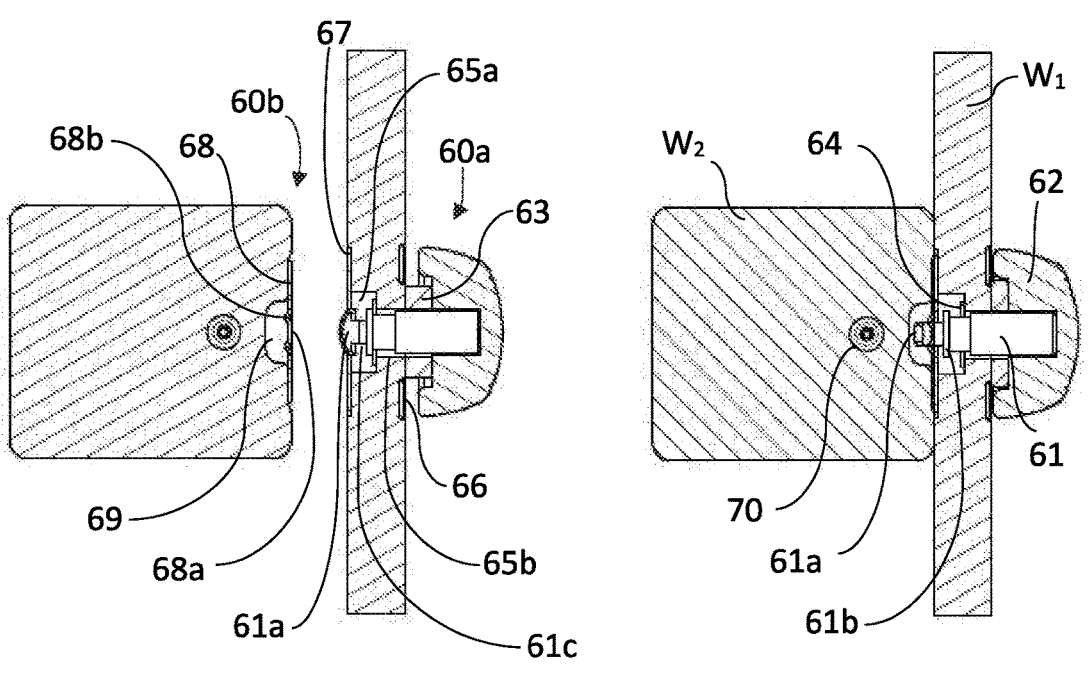
Section A-A                    Section B-B
Figure 1.b                    Figure 1.d

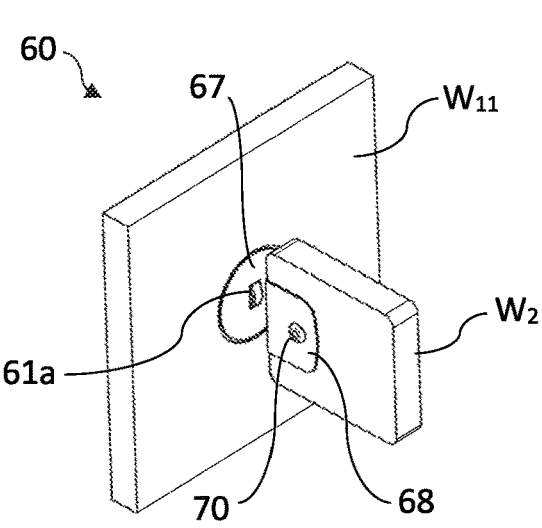
Figure 2.a
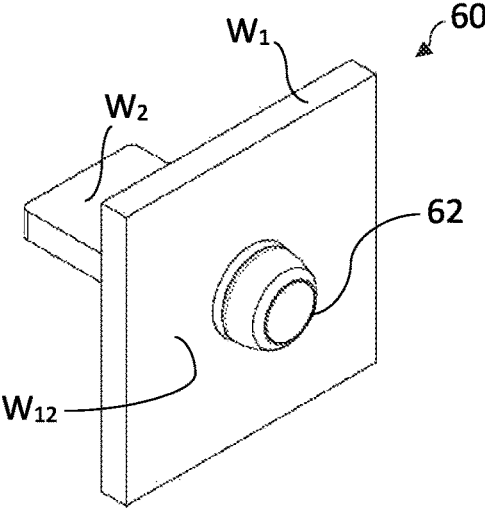
Figure 2.b
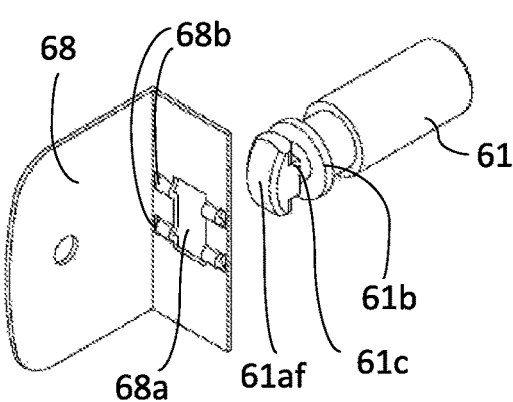
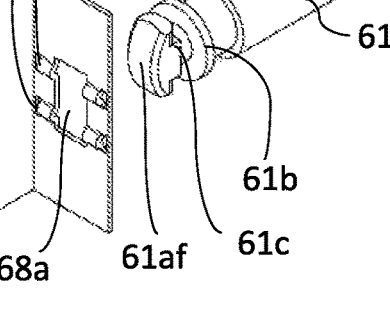
Figure 3.a
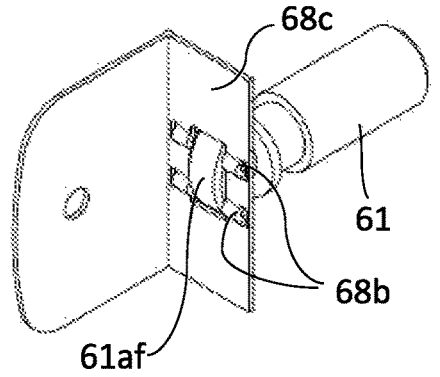
Figure 3.b
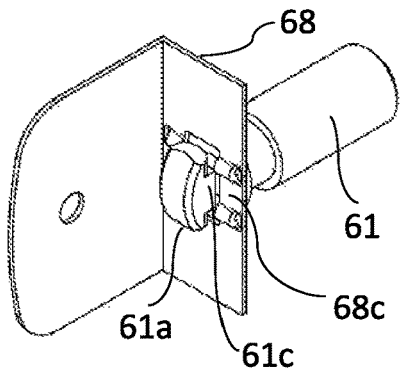
Figure 3.c
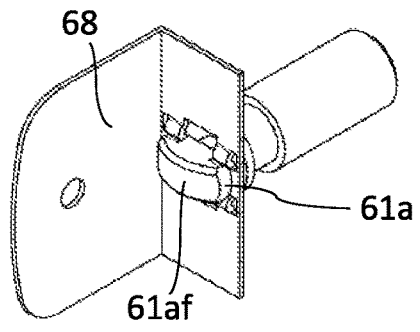
Figure 3.d

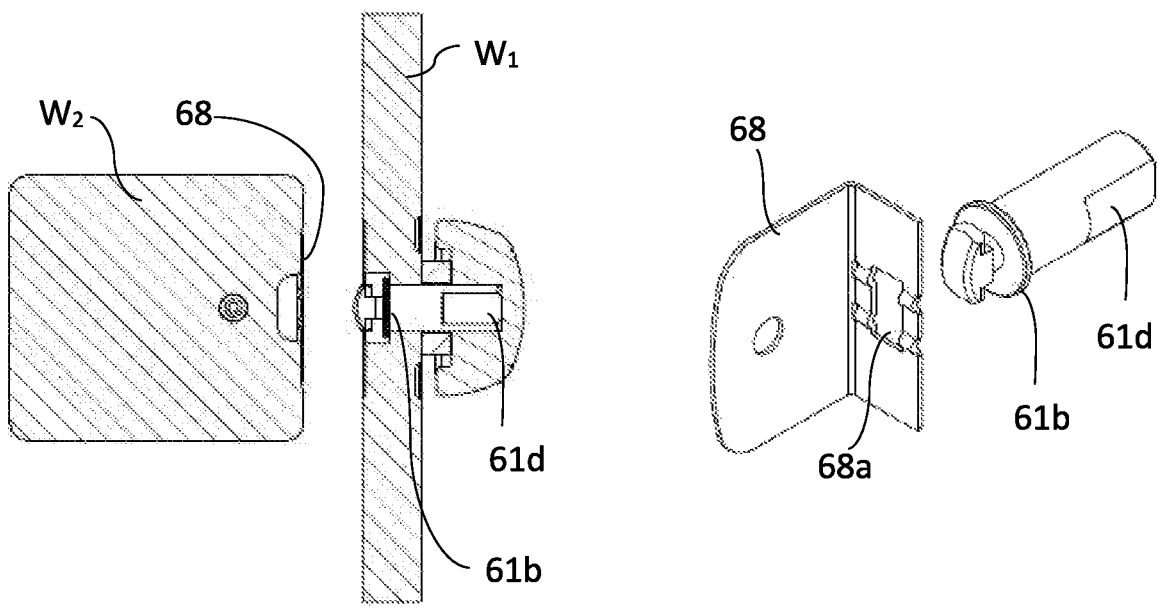
Figure 4.a                    Figure 4.b
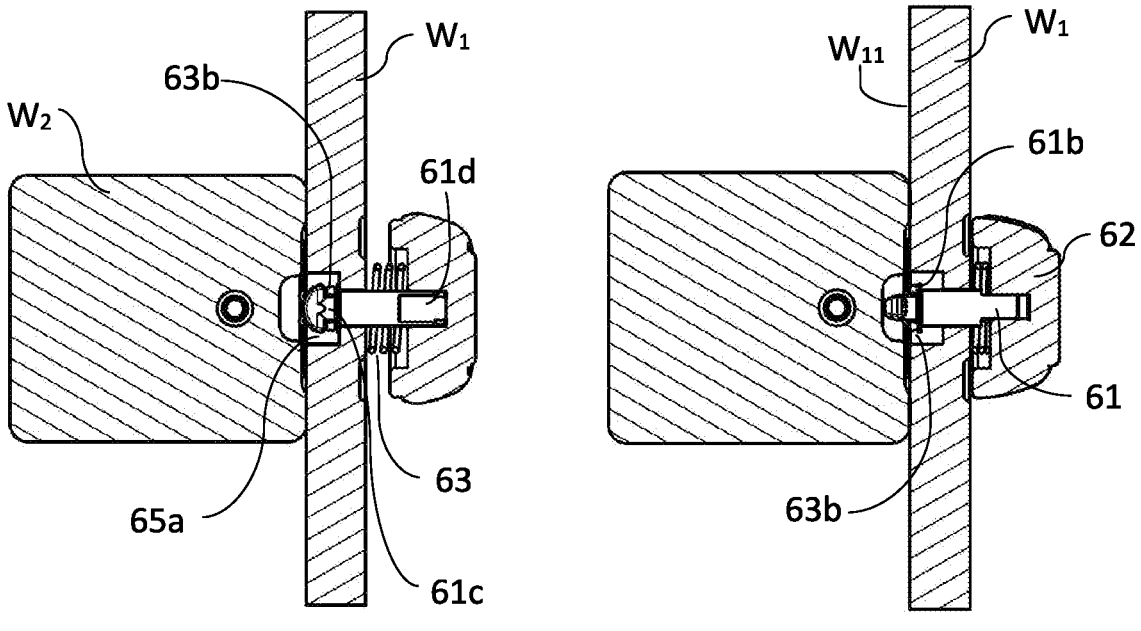
Figure 5.a                    Figure 5.b

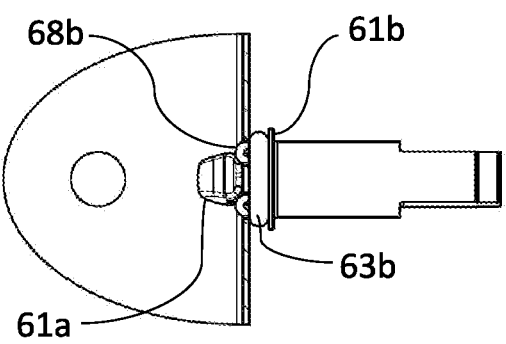
Figure 6.a
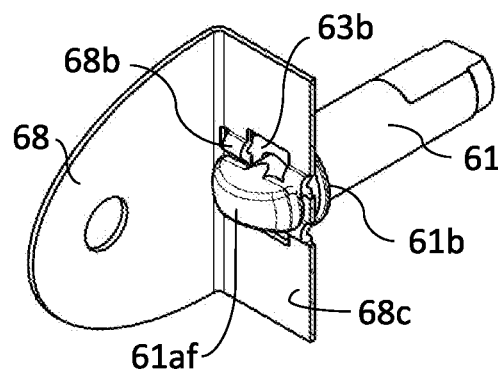
Figure 6.b
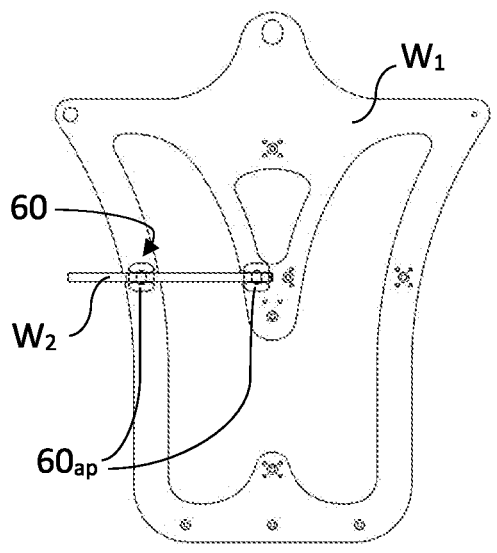
Figure 7.a
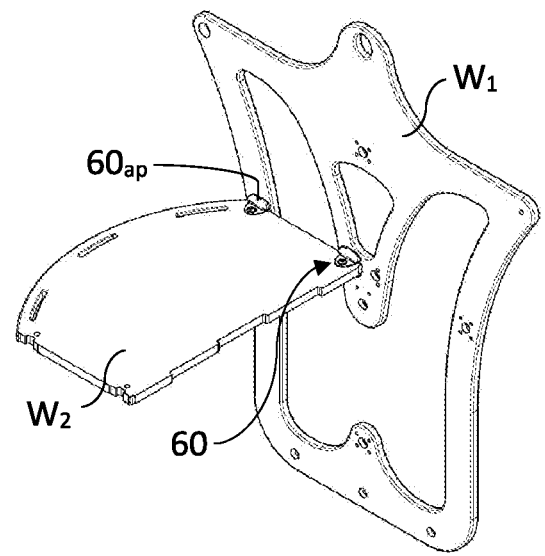
Figure 7.b

CONNECTING MEMBER AND ARRANGEMENT

TECHNICAL FIELD

The present invention relates to a connecting member that can be used especially in the furniture, toy and construction industries, which connecting member has an operating unit that can be mounted on a first structural element and a receiving unit that can be mounted on a second structural element to connect the two structural elements together. The invention also relates to an arrangement of such a connecting member within the structural elements to be connected.

In technical areas where there is a need for a relatively frequent releasable connection of two structural elements, especially in the assembly of various plates and elements used in variable furniture, toys, everyday objects, or light panels and walls used in the construction industry, it is important that the individual structural elements could safely be connected in a short time.

BACKGROUND ART

The invention disclosed in patent document JP2014204946 is a multi-functional children's toy, in which two curved side panels 100L, 100R are connected by rods 200 and plates of diverse shapes, and various additional elements can be attached to the base unit of the product assembled in this way (the reference marks in this paragraph indicate the features of this previous solution). The essence of this solution is the design of connecting elements 300, 306, which ensure the attachment of the connecting rods 200 to the side panels 100L, 100R, enable the child to play safely, without disengaging during use. At the two ends of the connecting rods 200,201 blind holes are formed to each receive middle pieces 300. The middle pieces are formed extending across the holes 103 formed on the side plates, where the characteristics 303, 102 of the middle piece and the hole of the side plates ensure a form-locking connection preventing the connecting rods from rotating during use. A cap 306 is placed on the threaded section 305 of the middle pieces extending beyond the side plate, where flexible elements 307 are inserted between the cap and the side plates in order to increase the friction between them. The caps also have flat 306a surfaces that allow the use of a wrench. Although the toy can be transformed with the help of the connecting elements, and thus many functions can be achieved, the variability and usability of the product is still relatively limited. In order to convert the toy, when the connecting elements are released, they must be disassembled into several parts, which, on the one hand, can cause the loss of individual parts, and on the other hand, it is a time-consuming operation that may also require a tool.

In the furniture industry, a large number of catalogs are available for selecting elements that help to connect two furniture panels (highlighted examples of this: Heavy Duty Turnlocks and IMAO Quarter-Turn Clamps sold by Anemo Engineering and DZUS® Quarter-Turn Fasteners sold by Southco). However, these are mainly used for the releasable connection of two sheets arranged parallel to each other and overlapping each other, without taking into account the need for easy and quick connection, they mostly ensure assembly and disassembly possibilities, where tools are needed.

The furniture connecting device taught in patent document EP 0036430 A1, which is considered to be the closest state of the art, has one element to be inserted into the two pieces of furniture to be connected, which are connected by a pin with a T-shaped head. After inserting the pin and turning it by a quarter turn, the T-shaped head also turns and prevents the two sheets from separating. To turn the pin, a separate tool, e.g. a screwdriver is required, it does not allow quick connection.

SUMMARY OF THE INVENTION

With the present invention, our goal was to develop a connecting member with which structural elements, especially furniture panels, can be quickly and safely connected to each other.

Our goal has been achieved by presenting a connecting member for connecting a first structural element to a second structural element, which connecting member has an operating unit that can be mounted on the first structural element and a receiving unit that can be mounted on the second structural element; wherein the operating unit contains a pin at one end of which a neck part and an elongated head part is formed, which together form a T-shape; a collar is formed on the pin on the side of the neck part opposite its side facing the head part in the direction of the axis of the pin; further the operating unit is provided with a handle attached to the end of the pin opposite the end on which the head part is formed; furthermore, the receiving unit contains a plate, on which an opening suitable for receiving and holding the head part is formed, the shape of which corresponds to the shape of the largest cross-section of the head part.

Preferably, the operating unit comprises an elastic element arranged on the pin between the collar and the handle. The operating unit preferably includes an elastic ring arranged around the neck part, which is a rubber ring or a silicone ring. The operating unit optionally contains a ring arranged on the pin between the collar and the elastic element, which ring is preferably a seeger ring.

The elastic element is preferably selected from the elements of the following group: silicone ring, rubber ring, rubber foam ring, corrugated washer, elastic washer, spring or combinations thereof.

Preferably four protruding elements are formed on the plate of the receiving unit around the opening protruding from the inner surface of the plate, forming a nest for receiving the head part; the edges of the protruding elements are preferably rounded, further the end surface of the head part is preferably curved and/or rounded along its edges.

The handle is optionally attached to end of the pin opposite the end on which the head part is formed by means of an unreleasable connection, for example by gluing. The operating unit optionally comprises a covering plate, in which an opening is created.

The connecting member is suitable for connecting two structural elements, where both the first structural element and the second structural element can be a piece of furniture, a toy element, or a panel used in the construction industry, etc.

According to a preferred embodiment of the arrangement of the connecting member relative to the structural elements the connecting member has an operating unit mounted on the first structural element and a receiving unit mounted on the second structural element; wherein the operating unit contains a pin arranged in a hole extending from a connecting first side of the first structural element to a second side opposite the first side; as well as a handle attached to the pin at the second side of the first structural element.

A cavity is formed in the second structural element on the connecting side of the second structural element; The receiving unit includes a plate covering the cavity and being fixed to the second structural element, on which plate an opening is formed. The pin has a neck part and an elongated head part on its end at the first side the first structural element, which neck part and head part together form a T-shape; wherein the shape of the opening formed on the plate of the receiving unit which is arranged on the second structural element corresponds to the shape of the largest cross-section of the head part, and the area of which essentially corresponds to the area of the largest cross-section of the head part; further, the operating unit comprises an elastic element arranged between the second side of the first structural element and the handle The pin has a collar formed between the neck part and the handle; and the hole includes a first section and a second section having a smaller diameter than the first section, wherein the head part and the collar are arranged in the first section.

The operating unit optionally includes an elastic ring arranged around the neck part, which is a rubber ring or a silicone ring.

The operating unit preferably further includes a ring arranged on the pin, the inner diameter of which is smaller than the diameter of the second section of the hole, and its outer diameter is greater than the diameter of the second section of the hole; wherein the ring is arranged in the first section of the hole, and wherein the ring is preferably a seeger ring.

The elastic element is preferably selected from the elements of the following group: silicone ring, rubber ring, rubber foam ring, corrugated washer, elastic washer, spring or combinations thereof. Preferably four protruding elements are formed on the plate of the receiving unit around the opening, protruding from the inner surface of the plate, forming a nest for receiving the head part, the edges of which are rounded. The end surface of the head part is preferably curved and/or rounded along its edges.

The handle is preferably attached to the end of the pin other than the end containing the head part by means of an unreleasable connection, for example by gluing. Optionally the head part is arranged to extend from the first structural element, i.e. from the plane of its first side by 0.2-2 mm, more preferably by 0.5 mm. The operating unit optionally includes a cover plate arranged on the first side of the first structural element, which has an opening; and the head part in this case is arranged to extend from the first structural element, i.e. from the cover plate by 0.2-2, more preferably by 0.5 mm. The second structural element is optionally a sheet and the plate is fixed to the second structural element by a pair of furniture screws.

BRIEF DESCRIPTION OF THE DRAWINGS

In the following, the invention will be described in detail with the help of the drawing, in the drawing FIG. 1.*a-b* are side and cross-sectional views of the connecting member according to the invention in the disconnected state, on the structural elements to be connected, FIG. 1.*c-d* are side and cross-sectional views of the connecting member in the connected state, on the connected structural elements, FIG. 2.*a-b* are perspective representations of the connecting member, FIG. 3.*a-d* show the pin of the operating unit of the connecting member and the plate of the receiving unit that receives and holds the pin during the connection process, FIG. 4.*a-b* are cross-sectional and perspective representations of the versions of the connecting member and its elements without a (seeger) ring, FIG. 5.*a-b* are cross-sectional representations of the elastic ring and spring design of the connecting member in the open and closed state, FIG. 6.*a-b* show the pin of the operating unit of the connecting member, as well as the plate of the receiving unit that accommodates and holds the pin in a side view and axonometrically, with the elastic ring arranged on the neck part of the pin, FIG. 7.*a-b*, the use of a connecting member for the connection of typical furniture panels, with a positioning element pair.

FIG. 1.*a-d* illustrate a preferred embodiment of the connecting member 60 according to the invention and its arrangement in and on the elements to be connected.

DETAILED DESCRIPTION

The connecting member 60 is suitable for connecting two structural elements, in the Figures these are generally marked with plates $W_1$ and $W_2$ to be connected. Although in FIGS. 1.*a-d*, 2.*a-b*, 3.*a-d* and 4.*a-b* we illustrate the structure of the connecting member 60 through the connection of sheet-like structural elements $W_1$, $W_2$, it can also be used for a block-like element, the simplest way being the adaptation of the plate 68 of the receiving unit 60*b* onto a block-like element, as detailed later.

As indicated in FIG. 1.*a-b*, the connecting member 60 consists of two units, on the one hand, the operating unit 60*a* arranged in the element $W_1$ and associated with it, and on the other hand, the receiving unit 60*b* arranged and associated with the element $W_2$. The side view shown in FIG. 1.*a* and the section taken on the A-A line in FIG. 1.*b* show a state where the two elements $W_1$, $W_2$ are not yet connected. In the side view FIG. 1.*c*, as well as in the section according to FIG. 1.*d* taken along line B-B, the connected state of the two elements $W_1$, $W_2$ can be seen, so in this case—as detailed later—the pin 61 has already been pushed into the cavity 69, and its 90-degree turning by the handle 62 has already been done.

The operating unit 60*a* contains a pin 61, which extends slightly, approximately 0.2-2 mm, preferably 0.5 mm, on the first connecting side $W_{11}$ of the element $W_1$; and on the second side $W_{12}$ of the element $W_1$, which is opposite the first side $W_{11}$ thereof, it extends to an even greater extent. An elastic element 63 is attached to the section of the pin 61 extending beyond the second side $W_{12}$ of element $W_1$, and for safety reasons, a rounded operating handle 62 is fixed with an unreleasable connection (for example, by gluing, or by notching the surfaces and then pressing them; FIG. 2.*b*). In this way, the handle 62 has a (blind) hole for receiving the pin 61, as well as an indentation that ideally ensures the movement of the elastic element 63 on the pin 61 and its extension in the axial direction due to pressure. A groove 66 is formed on the second side $W_{12}$ of the element $W_1$ to receive a handle rim created after forming this indentation and also for its firm fit. For the (partial) form-locking, anti-rotational connection of the pin 61 in the handle 62, these parts have at least one sided flattening 61*d*, as shown in FIG. 4.*a-b*.

A head part 61*a* and a neck part 61*c* are formed at the end of the pin $W_1$ element 61 towards the first side $W_{11}$, which neck part 61*c* and head part 61*a* together form a T-shape. Furthermore, a collar 61*b* is preferably formed on the pin 61 in order to keep the operating unit 60*a* in the element $W_1$. To perform their function, the parts $61a$-$c$ are placed in a hole section $65a$ formed in the element $W_1$. During operation the pin $61$ itself moves in the through hole formed in the element $W_1$ consisting of a first section $65a$ and a second section $65b$. The falling out of the pin $61$ is basically prevented by the collar $61b$, and to enhance this by a ring $64$, e.g. by a seeger ring arranged between a back wall of the hole section $65a$. The ring $64$ can even be omitted if the diameter of the collar $61b$ ensures that the operating unit $60a$ does not fall out of the element $W_1$. FIG. 4.$a$-$b$ show the version without ring $64$. The pin $61$ is rotationally symmetrical over most of its length, but the head part $61a$ has a flattened design on two sides. The curved head part $61a$ formed in this way, rounded on its end surface $61af$ and along its edges, with the appropriate dimensions, protrudes to the mentioned extent from the opening of the plate $67$ arranged on the first side $W_{11}$ of the element $W_1$ (FIGS. 1.$b$ and 2.$a$). The flexible element $63$ can be, among others, a spring, silicone ring, rubber ring, rubber foam ring, corrugated washer, flexible washer, pair of lens-shaped, air-trapping plates, etc., which can be pulled onto the pin $61$ or fitted to it.

The other part of the connecting member $60$ is the receiving unit $60b$ arranged on the element $W_2$. The unit $60b$ contains a cavity $69$ formed in the element $W_2$, on its side $W_{21}$ facing the structural element $W_1$, suitable for receiving the head part $61a$, as well as a plate $68$ covering the cavity $69$, fixed to the element $W_2$. If element $W_2$ is a sheet, then the plate $68$ is ideally a plate bent into a U-shape, as illustrated in FIGS. 1.$a$-$d$ and 2.$a$, which surrounds the element $W_2$, and with a fastening pair $70$ (which is preferably a pair of fastening elements used for furniture) is attached to the sheet $W_2$ (i.e. element $W_2$). An opening $68a$ is cut out on the plate $68$ (FIGS. 1.$b$ and 3.$a$), around which on the inner surface $68c$ of the plate $68$, on the side facing element $W_2$, preferably four, preferably semi-cylindrical protrusions $68b$, protruding elements are formed as shown in FIG. 3.$a$-$d$. In general, four protruding elements $68b$ are formed on the plate $68$ of the receiving unit $60b$, around the opening $68a$, forming a nest for receiving the head part $61a$, the edges of which are rounded.

In the course of the connection of the elements $W_1$ and $W_2$ to each other, the pin $61$ of the unit $60a$ is pushed into the cavity $69$ of the receiving unit $60b$, during which it passes through the opening $68a$. After passing through, by turning the handle $62$ by a quarter turn (90 degrees), the pin $61$ and thus its head part $61a$ also rotates—this process can be seen in FIG. 3.$a$-$d$—and the head part $61a$ fits into the position (nest) defined by the four protruding elements $68b$. Due to the curved design of the head part $61a$ and the protruding elements $68b$, these two types of elements $61a$, $68b$ easily roll on each other's surfaces, so that both connecting and disconnecting ensure a firm, reliable connection, and by applying the appropriate force and torque—which can be exerted by an adult—these are easily manageable processes.

An important characteristic of the connecting member $60$ is that, due to the retraction effect of the elastic element $63$, in the connected state, the back surface of the head part $61a$ is stretched against the inner surface $68c$ of the plate $68$ arranged on the receiving unit $60b$, thereby providing a pulling force that prevents the connecting member $60$ from loosening during use. In addition, the elastic element $63$ prevents the unwanted movement (wobbling) of the elements of the unit $60a$ in relation to each other and to the element $W_1$ even when the connecting member $60$ is in a disconnected state, thus avoiding large-scale wear of the elements of the unit $60a$, and especially that of the element $W_1$, which would pose a safety risk.

When for the purpose of changing function (of the furniture, toy, etc)—after disconnecting the pin $61$ and the plate $68$ of the connecting member $60$—a specific element $W_1$, $W_2$ is removed from the assembly of furniture, toy, utility object, due to the collar $61b$ and/or the ring $64$, the disconnected parts of the connecting member $60$ remain in their place, i.e. in/on the corresponding element $W_1$, $W_2$; they do not fall out or hang out of the plane of the corresponding connecting side $W_{11}$ $W_{21}$ of the element $W_1$, $W_2$ in such a way that the person using the given furniture, toy, or household item assembly, etc. could be injured. By grasping the handle $62$ on the second side $W_{21}$ of the structural element $W_1$ and turning it by a quarter circle in any direction, the two elements $W_1$, $W_2$ are disconnected or connected, let they be arranged either parallel or perpendicular with respect to each other. A great advantage of the connecting member $60$ according to the invention is that it is not necessary to disassemble the entire assembly if we want to replace a specific structural element, as it is necessary to do, for example, in the solution disclosed in patent document JP2014204946 by removing its connecting rods and the middle parts arranged in them.

The cross-sectional FIG. 5.$a$-$b$ show an embodiment of the connecting member $60$ and its arrangement on the elements $W_1$ and $W_2$ to be connected, where an elastic ring $63b$ is used around the neck part $61c$. In this case, it is not worth using cover plate $67$. The elastic ring $63b$ is preferably made of rubber or silicone or any other suitable elastic material that enables connection. The use of the elastic ring $63b$ greatly enhances the definite and precise fitting of the head part $61a$ into the receiving unit $60b$ of the connecting member $60$, and its closing after rotation. FIG. 5.$a$-$b$ also show the elastic element $63$ not as a silicone ring, but as a spring design. The use of the spring or silicone ring version of the elastic element $63$ illustrated in the Figures is independent of whether an elastic ring $63b$ and/or a seeger ring $64$ is used on the pin $61$. FIG. 5.$a$ shows the open (disconnected) state of the connecting member $60$, and FIG. 5.$b$ shows its closed (connected) state.

FIG. 6.$a$-$b$ show the pin $61$ of the operating unit $60a$ of the connecting member $60$, as well as the plate $68$ of the receiving unit $60b$ that receives and holds the pin $61$ in a side view (FIG. 6.$a$) and axonometrically (FIG. 6.$b$); the pin $61$ with the elastic ring $63b$ arranged on the neck part $61c$, in the closed state of the connecting member $60$.

In order to facilitate the connection of the elements $W_1$ and $W_2$, the connecting member $60$ can easily be positioned to the cavity $69$ formed on the element $W_2$ or to the plate opening $68a$ due to the small, typically 0.2-2 mm, preferably 0.5 mm protruding of the rounded head part $61a$ from the plane of the first side $W_{11}$ of element $W_1$. In order to make this positioning even easier, additional positioning elements $60ap$ can also be used where appropriate, which are especially advisable to use when connecting two sheet-like structural elements $W_1$ and $W_2$, on the first side $W_{11}$ of the first structural element $W_1$, to be placed around the head part $61a$ which slightly protrudes from first side $W_{11}$ as detailed above. Such positioning element pairs $60ap$—surrounding the structural element $W_2$, at its given receiving unit $60b$—can be seen in FIG. 7.$a$-$b$, placed at the connection points of two typical structural elements. The connecting member $60$ is essentially a quick switch, it is easy for an adult to use, however, both connecting and disconnecting requires the application of forces and torques of a magnitude and direction that a child cannot exert, therefore during use or playing the disconnection of the connecting members $60$ is excluded.

Advantages of the connecting member 60 according to the invention are its design enabling fast, firm and safe connection, as well as its user-friendly shape and operation that does not require special tools. A further advantage is that it is not only suitable for connecting sheets (plates) arranged parallel to each other, but also for reliably connecting sheets (plates) that are perpendicular to each other.

The invention claimed is:

1. A connecting member for connecting a first structural element to a second structural element, wherein the connecting member comprises:
   an operating unit mounted on the first structural element;
   a receiving unit mounted on the second structural element;
   wherein the operating unit comprises:
      a pin;
      a neck part at an end of the pin;
      an elongated head part formed on the pin proximate the neck part;
      wherein the neck part and the elongated head part together form a T-shape;
      a collar formed on a side of the neck part of the pin opposite a side facing the head part in a direction of an axis of the pin;
      a handle attached to an end of the pin opposite the end on which the head part is formed;
   wherein the receiving unit comprises:
      a plate defining an opening;
      wherein the plate opening is suitable to receive and hold the formed head part; and
      wherein a shape of the plate opening corresponds to a shape of a largest cross-section of the head part.

2. The connecting member according to claim 1, wherein the operating unit comprises an elastic element arranged on the pin between the collar and the handle.

3. The connecting member according to claim 2, wherein the operating unit contains a ring arranged on the pin between the collar and the elastic element, and wherein the ring is a seeger ring.

4. The connecting member according to claim 2, wherein the elastic element is one of a silicone ring, a rubber ring, a rubber foam ring, a corrugated washer, an elastic washer, a spring and combinations thereof.

5. The connecting member according to claim 1, wherein the operating unit-includes an elastic ring arranged around the neck part, wherein the elastic ring is one of a rubber ring and a silicone ring.

6. The connecting member according to claim 1, wherein the plate of the receiving unit includes four protruding elements disposed around a plate opening and protruding from an inner surface of the plate, and wherein the four protruding elements form a nest for receiving the head part.

7. The connecting member according to the claim 6, wherein the edges of the protruding elements are rounded.

8. The connecting member according to claim 6, wherein an edge of an end surface of the head part is curved or rounded.

9. The connecting member according to claim 1, wherein the handle is non-removably attached to a first end of the pin opposite a second end on which the head part is formed.

10. A member arrangement for connecting a first structural element to a second structural element, wherein the connecting member comprises:
   an operating unit mounted on the first structural element;
   a receiving unit mounted on the second structural element;

wherein the operating unit includes:
   a pin arranged in a hole, wherein the hole extends from a connecting first side of the first structural element to a second side of the first structural element, wherein the second side is opposite the first side;
   wherein the pin comprises a neck part and an elongated head part on an end at the first side of the first structural element, wherein the neck part and the head part together form a T-shape;
   a collar formed on a side of the neck park of the pin opposite a side facing the head part in a direction of an axis of the pin;
   a cavity formed on a connecting side of the second structural element;
   wherein the operating unit includes a handle attached to the pin at the second side of the first structural element;
   wherein the receiving unit includes a plate fixed to the second structural element and positioned to cover the cavity;
   wherein the plate defines an opening suitable to receive and hold the formed head part, and wherein a shape of the opening corresponds to a shape of a largest cross-section of the head part.

11. The connecting member arrangement according to claim 10, wherein the operating unit comprises an elastic element arranged between the second side of the first structural element and the handle.

12. The connecting member arrangement according to claim 10, wherein the operating unit includes an elastic ring arranged around the neck part, and wherein the elastic ring is one of a rubber ring and a silicone ring.

13. The connecting member arrangement according to claim 10, wherein the hole comprises a first section and a second section having a smaller diameter than a diameter of the first section, and wherein the head part and the collar are arranged in the first section.

14. The connecting member arrangement according to claim 10, wherein the operating unit further includes a ring arranged on the pin;
   wherein an inner diameter of the ring is smaller than a diameter of the second section of the hole;
   wherein an outer diameter of the ring is greater than the diameter of the second section of the hole;
   wherein the ring is arranged in the first section of the hole; and
   wherein the ring is a seeger ring.

15. The connecting member arrangement according to claim 10, wherein the elastic element is one of a silicone ring, a rubber ring, a rubber foam ring, a corrugated washer, an elastic washer, a spring and combinations thereof.

16. The connecting member arrangement according to claim 10, wherein the plate of the receiving unit comprises:
   four protruding elements disposed around a plate opening, and protruding from an inner surface of the plate;
   wherein the four protruding elements form a nest for receiving the head part; and
   wherein edges of the protruding elements are rounded.

17. The connecting member arrangement according to claim 10, wherein an edge of an end surface of the head part is curved or rounded.

18. The connecting member arrangement according to claim 10, wherein the handle is non-removably attached to an end of the pin opposite an end on which the head part is formed.

19. The connecting member arrangement according to claim 10, wherein the head part is arranged to extend from the first structural element, by 0.2 mm-2 mm.

20. The connecting member arrangement according to claim 10, wherein the operating unit includes:

a cover plate arranged on the first side of the first structural element, wherein the cover plate defines an opening; and the head part is arranged to extend from the first structural element, by 0.2 mm-2 mm.

\* \* \* \* \*